No. 695,519. Patented Mar. 18, 1902.
G. WILCOX.
SOLDER CHARGED CAN BODY AND SHEET METAL BLANK.
(Application filed June 11, 1901.)
(No Model.)
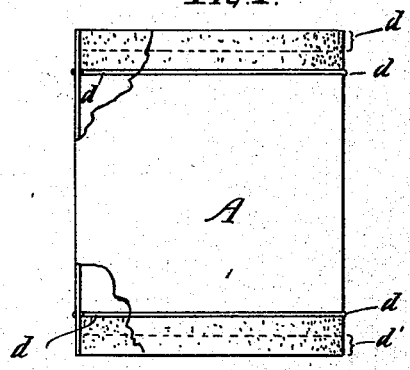
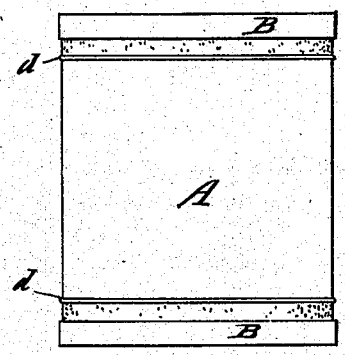
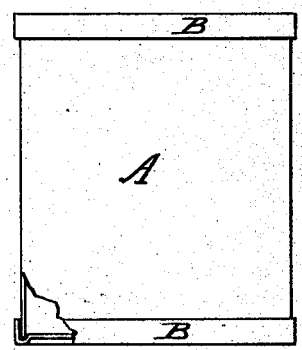
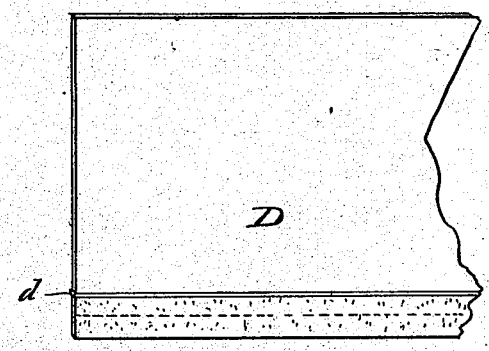
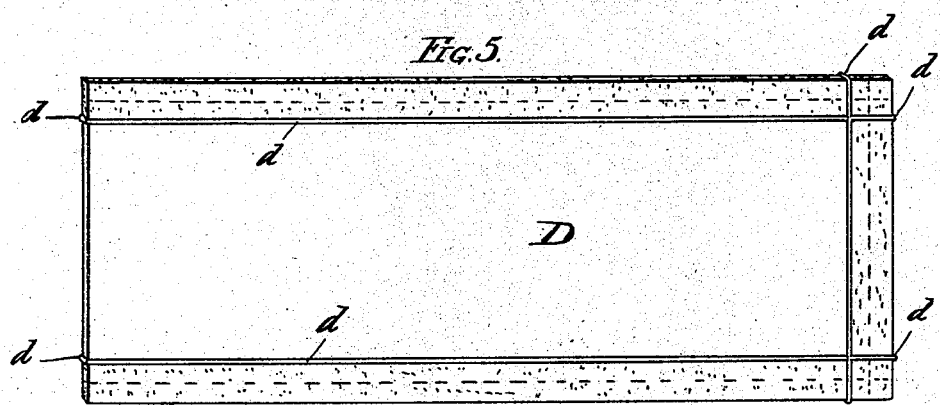
WITNESSES:
H. A. Farnham
Edw. L. Reed
INVENTOR.
George Wilcox
BY Ellis Spear
His ATTORNEY
THE NORRIS PETERS CO., PHOTO-LITHO., WASHINGTON, D. C.

UNITED STATES PATENT OFFICE.

GEORGE WILCOX, OF LOS ANGELES, CALIFORNIA, ASSIGNOR TO AMERICAN CAN COMPANY, OF JERSEY CITY, NEW JERSEY, A CORPORATION OF NEW JERSEY.

SOLDER-CHARGED CAN-BODY AND SHEET-METAL BLANK.

SPECIFICATION forming part of Letters Patent No. 695,519, dated March 18, 1902.

Application filed June 11, 1901. Serial No. 64,162. (No model.)

*To all whom it may concern:*

Be it known that I, GEORGE WILCOX, a citizen of the United States, residing in Los Angeles, in the county of Los Angeles and State of California, have invented a new and useful Improvement in Solder-Charged Can-Bodies and Sheet-Metal Blanks, of which the following is a specification.

My invention relates to can bodies or blanks used in the manufacture of sheet-metal cans.

My invention consists in a can body or blank charged with a rib or narrow strip or fillet of solder necessary for forming a seam removed from but adjacent to the seam-section of the can body or blank. The solder rib or strip is fusibly united to the tin coat of the can body or blank. The can body or blank is preferably furnished with narrow ribs, strips, or fillets of solder fusibly united thereto on both sides, so that the solder may be supplied to the joint or seam to be formed both on the inside and on the outside of the can.

My invention further consists in a can body or blank charged with a rib or narrow strip or fillet of solder fusibly united thereto adjacent to but removed from the seam-section thereof and having the raw edge of the tin-coated iron or steel plate covered with and protected by solder fusibly united thereto at the raw or cut edge of the blank.

In the accompanying drawings, forming a part of this specification, Figure 1 is a side elevation of a sheet-metal can-body embodying my invention, the same being partially broken away to show the rib or narrow strip of solder on the inside as well as on the outside thereof. Fig. 2 is a similar view showing the heads applied to the can-body. Fig. 3 is a similar view showing the end seams of the can soldered. Fig. 4 shows the invention as applied to a blank in the flat before being formed up into a can-body or other part of a can. Fig. 5 shows the invention as applied to a can-body blank in the flat and provided with ribs or narrow strips or fillets of solder fusibly united thereto for soldering both side and end seams of the can, and Fig. 6 is an enlarged section.

The can body or blank may be preferably charged or provided with the rib or narrow strip or fillet of solder necessary for soldering the same by dipping or immersing it in a vertical position in a bath of molten solder to the depth of about a half an inch, then withdrawing it from the solder, and then inverting the can body or blank, all before the solder sets, thus causing by a natural law the solder adhering to the can body or blank to form or collect in a narrow rib, fillet, or strip at or near the margin of the immersed section of the can body or blank, and thereby leaving the seam-section of the can body or blank substantially free from solder or only coated with an infinitesimal thin film thereof, so that the absolutely essential tight close fit between the can-body and can-head is not interfered with by the solder, as the solder rib or fillet is beyond or removed from the seam-section of the can-body. At the same time, however, the raw edge of the can body or blank is fully covered and protected by a coating of solder, so that no defectively-soldered joints or leaks can result from such raw edge, as heretofore has frequently been experienced. In this method of forming the rib or narrow strip or fillet of solder on the can body or blank the same operation produces such solder rib or strip on both sides of the blank. It is of great advantage to have the solder rib, fillet, or strip on the inside of the can-body as well as on the outside thereof, as the solder rib, fillet, or strip on the inside furnishes the solder necessary for properly entering or filling the crease at the point or line of union between the can-body and can-head on the inside, and thus insures the thorough sweating of the solder throughout the entire joint.

In soldering the seams of cans the bodies or other parts of which are charged with solder ribs or fillets according to my invention all that is necessary to do is to heat the seam-section and apply heat to the solder rib, fillet, or strip above the seam to fuse the same, when the solder will flow down and form a strong and perfectly-soldered seam.

By use of my invention strong and perfectly-soldered seams, such as required in cans for putting up hermetically-sealed food products, may be made with much less solder than it has heretofore been customary to use, thus resulting in a great saving in the cost of manufacture.

The solder ribs or fillets may be applied to the can bodies or blanks in any suitable way. I have, however, described what I believe to be the best way now known to me to do this.

In the drawings, A represents a can-body of tin-plate; B, the can-heads, having the customary close, tight, exterior fitting flanges b. The can-body A is provided with ribs or narrow strips or fillets of solder d, fusibly united thereto adjacent to the seam-sections d' of the can-body, but removed therefrom, the same being preferably on both sides thereof.

D represents the blank in the flat, which may be used for forming a can-body or other part of the can. It is provided with solder ribs or strips d adjacent to the seam-sections d' thereof, but removed therefrom. As illustrated in Fig. 5, the blank D is provided with solder ribs or fillets d for forming both the side and end seams of the can, the solder ribs or fillets being on both sides of the blank.

I claim—

1. A blank for can-bodies comprising a metal sheet having a line or ridge of solder attached to it, said body-blank having below said solder ridge and between the same and the edge a surface upon which the flange of the can head or bottom is to be fitted, substantially as described.

2. As a new article of manufacture, a tin-plate blank charged or provided with narrow ribs or fillets of solder on both sides thereof, removed from but adjacent to the seam-section of the blank, substantially as described.

3. As a new article of manufacture, a sheet-metal blank charged or provided with a narrow rib or fillet of solder necessary for forming a seam, removed from but adjacent to the seam-section of the blank and united to the blank, said blank having its raw or cut edge coated and protected with solder, substantially as specified.

4. A tin-plate blank furnished with narrow ribs or strips of solder for forming the side and end seams of the can, removed from but adjacent to the seam-sections of the blank, the said solder strips being attached to the plain surface of the body-blank, substantially as specified.

5. A tin-plate blank furnished with narrow ribs or strips of solder for forming the side and end seams of the can removed from but adjacent to the seam-sections of the blank, said narrow ribs or strips of solder being on both sides of the blank, substantially as specified.

6. A can-body charged or provided with a narrow rib or strip of solder necessary for forming the seam, removed from but adjacent to the seam-section of the can-body and united to said body, said solder strip being attached to the plain surface of the body, substantially as described.

7. A can-body charged or provided with narrow ribs or strips of solder on both sides thereof, removed from but adjacent to the seam-section thereof, the can-body having its raw or cut edge coated with solder, substantially as specified.

8. A can-body charged or provided with a narrow rib or strip of solder necessary for forming the seam, removed from but adjacent to the seam-section of the can-body and united to said body, the said solder strip being attached to the plain surface of the body and the raw or cut edge of the body being coated with solder, substantially as described.

GEORGE WILCOX.

Witnesses:
HENRY E. COOPER,
JAMES M. SPEAR.